United States Patent
Sato

(10) Patent No.: US 6,435,960 B2
(45) Date of Patent: Aug. 20, 2002

(54) INSIDE/OUTSIDE AIR SWITCHING DEVICE WITH ROTARY DOOR

(75) Inventor: Yasuhiro Sato, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/906,191

(22) Filed: Jul. 16, 2001

(30) Foreign Application Priority Data

Jul. 19, 2000 (JP) ........................................ 2000-219010

(51) Int. Cl.$^7$ ................................................. B60H 1/24
(52) U.S. Cl. ................ 454/139; 137/625.4; 137/625.44
(58) Field of Search ................ 454/69, 139; 137/625.4, 137/625.44

(56) References Cited

U.S. PATENT DOCUMENTS

| | | | |
|---|---|---|---|
| 4,683,913 A | * | 8/1987 | Hoffman et al. ......... 137/625.4 |
| 5,720,657 A | * | 2/1998 | Kamiya et al. .............. 454/121 |
| 5,836,813 A | * | 11/1998 | Miyata et al. ............... 181/225 |

FOREIGN PATENT DOCUMENTS

| | | |
|---|---|---|
| JP | A-9-188124 | 7/1997 |
| JP | 2000-211339 | 8/2000 |
| JP | 2000-225824 | 8/2000 |

* cited by examiner

Primary Examiner—Harold Joyce
(74) Attorney, Agent, or Firm—Harness, Dickey & Pierce, PLC

(57) ABSTRACT

In an inside/outside air switching device, a seal member is provided at a position around a rotation center axial line of a rotary door, for sealing an inside/outside air switching box in an axial direction. The rotary door is disposed to be elastically deformable in such a manner that at least both parts of side wall plates of the rotary door around the rotation center axial line are displaced away from each other by a dynamical pressure of a vehicle travelling, applied to an outer wall plate of the rotary door, in an inside air mode. The seal member press-contacts the inside/outside air switching box when at least both the parts of the side wall plates around the rotation center axial line are displaced away from each other.

13 Claims, 5 Drawing Sheets

INSIDE/OUTSIDE AIR SWITCHING DEVICE WITH ROTARY DOOR

CROSS-REFERENCE TO RELATED APPLICATION

This application is related to Japanese Patent Application No. 2000-219010 filed on Jul. 19, 2000, the contents of which are hereby incorporated by reference.

BACKGROUND OF THE INVENTION

1. Field of the Invention

The present invention relates to an inside/outside air switching device using a rotary door as an inside/outside air switching door. More particularly, the present invention relates to a seal structure of the inside/outside air switching door in an inside air mode.

2. Description of Related Art

A conventional rotary-type inside/outside air switching door is formed into a gate shape having a rotation shaft inserted into both bearing holes, an outer wall plate extending in a rotation direction around the rotation shaft, and both side wall plates connecting the outer wall plate and both axial ends of the rotation shaft. Further, a packing member is provided in periphery portions of the side wall plate and the outer wall plate, and a seal surface is provided on an inside/outside air switching box to have a shape corresponding to the packing member. In the inside/outside air switching device, for obtaining a seal function between the inside/outside air switching door and the inside/outside air switching box, the packing member is pressed to the seal surface in the rotation direction of the rotation shaft. On the other hand, in the axial direction of the rotation shaft, a clearance is provided between a part of the side wall plates around the rotation shaft and an inner surface of the inside/outside air switching box, for rotating the inside/outside air switching door.

However, in an inside air mode where the inside/outside air switching door closes an outside air suction port of the inside/outside air switching box and closes an outside air suction port of the inside/outside air switching box, air pressure at a side of the outside air suction port of the rotary door becomes higher due to dynamical pressure (ram pressure) in a vehicle travelling. Accordingly, in this seal structure of the inside/outside air switching door, because the clearance is provided between the part of the side wall plate around the rotation shaft and the inner surface of the inside/outside air switching box, outside air may be leaked due to the dynamical pressure in the vehicle traveling. Thus, in the inside air mode, outside air may be mixed into inside air within the inside/outside air switching box.

SUMMARY OF THE INVENTION

In view of the foregoing problems, it is an object of the present invention to provide an inside/outside air switching device with a rotary door, which prevents a leakage of outside air from the inside/outside air switching door into an inside/outside air switching box in an inside air mode.

According to the present invention, in an inside/outside air switching device, a rotary door for selectively opening and closing an inside air suction port and an outside air suction port is disposed in an inside/outside air switching box to be rotatable around a rotation center axial line, and a seal member for sealing the inside/outside air switching box in an axial direction is provided at a position around the rotation center axial line. The rotary door includes an outer wall plate extending in the rotation direction of the rotary door, and both side wall plates extending from both end portions of the outer wall plate in an axial direction toward the rotation center axial line, respectively. The rotary door is disposed to be elastically deformable in such a manner that at least both parts of the side wall plates around the rotation center axial line are displaced away from each other by a dynamical pressure of a vehicle travelling, applied to the outer wall plate, in an inside air mode where the rotary door closes the outside air suction port and opens the inside air suction port. Further, the seal member press-contacts the inside/outside air switching box when at least both the parts of the side wall plates around the rotation center axial line are displaced away from each other by a predetermined distance. Thus, when the rotary door closes the outside air suction port and opens the inside air suction port in the inside air mode, the seal member press-contacts the inner surface of the inside/outside air switching box to seal a clearance between the inside/outside air switching box and the rotary door in the axial direction. Accordingly, in the inside air mode, it can prevent a leakage of outside air from the inside/outside air switching door (rotary door) into the inside/outside air switching box.

On the other hand, when the vehicle is travelling in low speed lower than a predetermined speed, the dynamical pressure in the vehicle travelling becomes lower. In this case, the displacement of the side wall plates due to the elastic deformation of the rotary door becomes smaller, and the seal member does not contact the inner surface of the inside/outside air switching box. However, because the dynamical pressure applied to the outer wall plate of the rotary door is small, a leakage of outside air into the inside/outside air switching box in the inside air mode can be substantially prevented. In this case, a sliding pressure of the rotary door can be reduced.

Preferably, in a natural state of the rotary door, both the side wall plates are tilted, respectively, toward the sides of the displacements, relative to a direction perpendicular to the outer wall plate. Therefore, a rotation moment generated to the side wall plates in the rotation direction of the rotary door can be increased, and the side wall plates can be readily displaced away from each other. More preferably, the tilt angle of each side wall plate is equal to or larger than 10 degrees.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

A first preferred embodiment of the present invention will be described hereinafter with reference to FIGS. 1–4.

Figure 1:
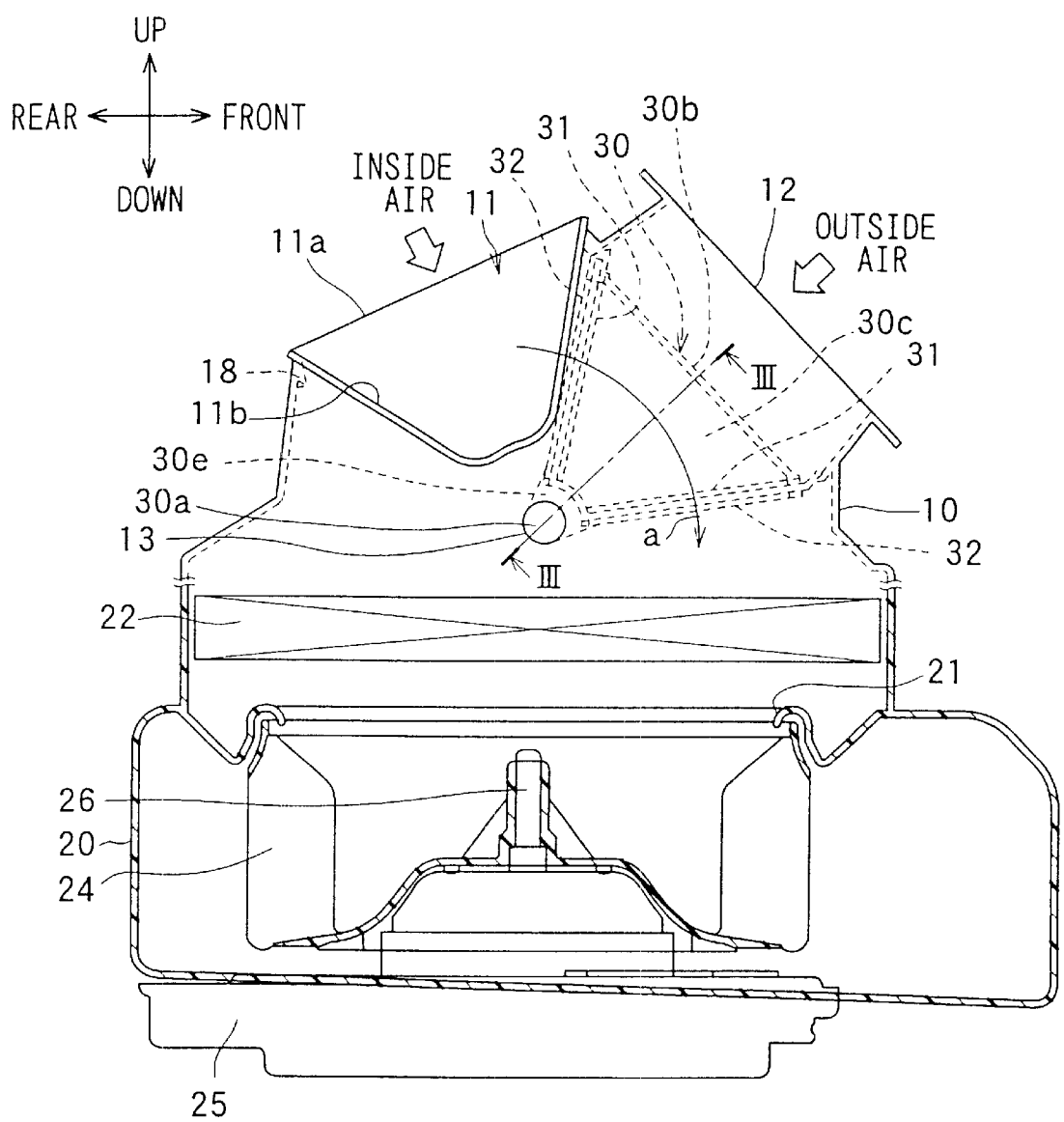
FIG. 1 is a schematic sectional view showing a blower unit including an inside/outside air switching device, for a vehicle air conditioner, according to a first preferred embodiment of the present invention.

FIG. 1 shows a blower unit including an inside/outside air switching device and a blower, disposed in a ventilation system of a vehicle air conditioner, in an inside air mode.

Generally, the blower unit is disposed under an instrument panel at a front side in a passenger compartment of a vehicle on a front-passenger's side. An inside/outside air switching box (case) 10 made of a plastic resin defines an air passage of the inside/outside air switching device. A scroll casing 20 is disposed under the inside/outside air switching box 10 adjacent to the inside/outside air switching box 10, so that an inner side of the inside/outside air switching box 10 communicates with a bell-mouth like suction port 21 of the scroll casing 20.

An air filter 22 for filtering dust contained in air and for removing a smelling component in air is disposed in the scroll casing 20 at an upstream air side of the bell-mouth like suction port 21. The air filter 22 is constructed by a filter material, and a resinous frame. In the filter material of the air filter 22, an absorption material such as an activated carbon for absorbing smelling components may be added in accordance with a necessity. However, the present invention may be applied to an air conditioner without providing the air filter 22.

A blower fan 24 composed of a centrifugal multi-blade fan (sirocco) is disposed in the scroll casing 20 at a downstream air side of the air filter 22. That is, the fan 24 is disposed in the scroll casing 20 so that air sucked from a suction port 21 flows toward a radial outside of the fan 22 by the rotation of the fan 22. The fan 24 is connected to a rotation shaft 26 of a driving motor 25 to be rotated.

The inside/outside air switching box 10 has an inside air suction port 11 from which inside air inside the passenger compartment is introduced, and an outside air suction port 12 from which outside air outside the passenger compartment is introduced. In a vehicle front-rear direction, the inside air suction port 11 is provided at a vehicle rear side of the outside air suction port 12.

Figure 2:
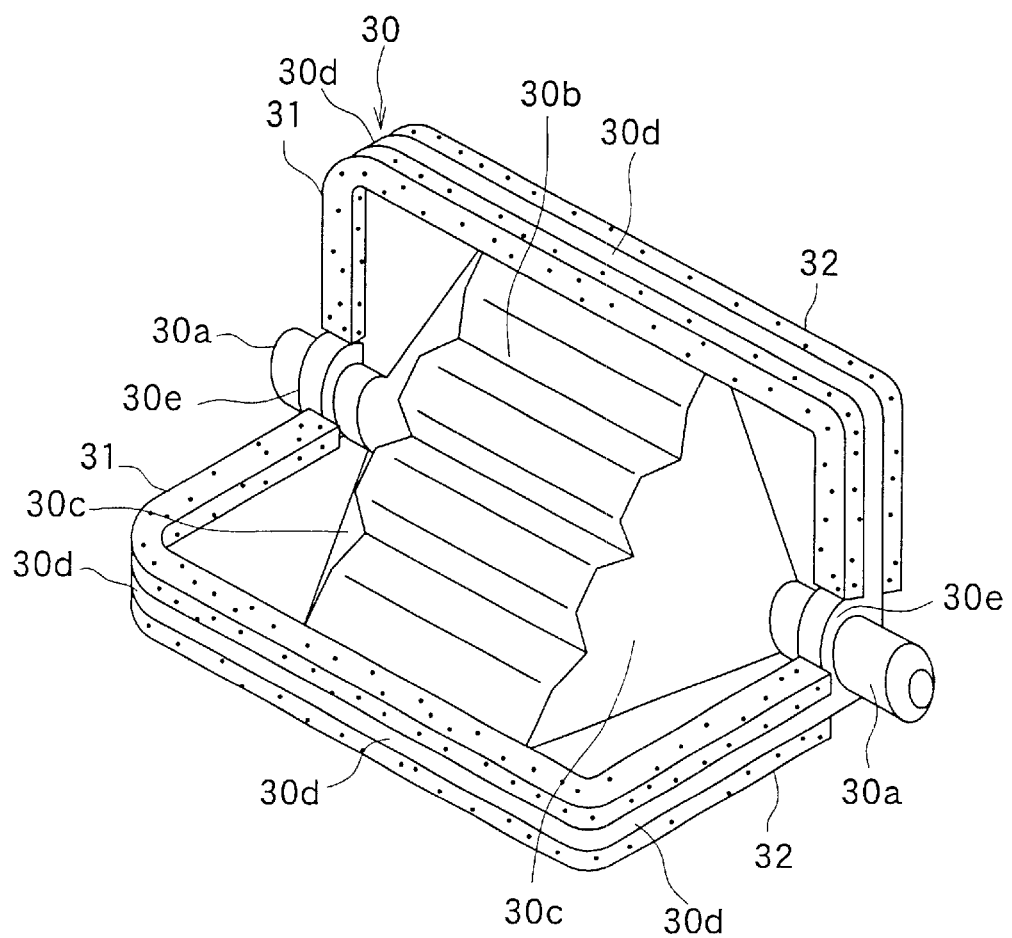
FIG. 2 is a perspective view showing an inside/outside air switching door according to the first embodiment.

Within the inside/outside air switching box 10, a rotary-type inside/outside air switching door 30 (i.e., rotary door) is rotatably disposed to open and close the inside air suction port 11 and the outside air suction port 12. As shown in FIGS. 2 and 3, both bearing holes 13 are provided in the inside/outside air switching box 10 to have the same axial center line φ, and the rotary-type inside/outside air switching door 30 is disposed to be rotated around the same axial center line φ of the bearing holes 13.

Figure 3A:
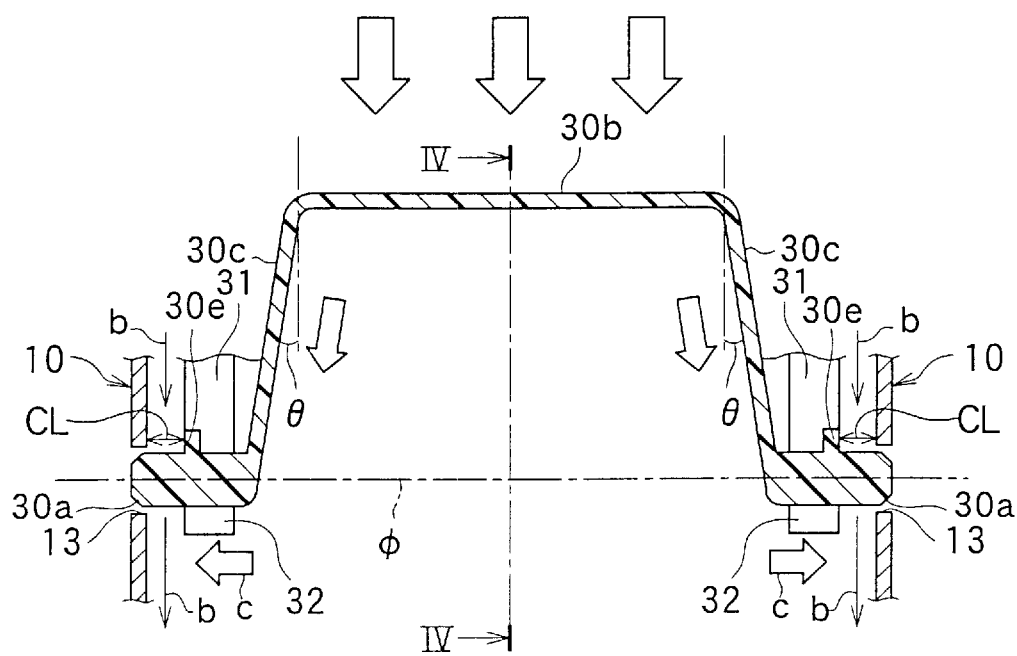
FIGS. 3A and 3B are cross-sectional views taken along line III—III in FIG. 1, FIG. 3A showing a natural state of the inside/outside air switching door without an elastic deformation and FIG. 3B showing an elastic deformation state of the inside/outside air switching door, according to the first embodiment.

FIG. 2 is a perspective view showing the rotary-type inside/outside air switching door 30. The inside/outside air switching door 30 has both rotation shafts 30a inserted into the bearing holes 13, an outer wall plate 30b extending in a door rotation direction, and both side wall plates 30c connecting both end portions of the outer wall plate 30 in an axial direction and the rotation shaft 30a. That is, as shown in FIG. 3A, the inside/outside air switching door 30 is formed into a gate-like sectional shape. The rotation shafts 30a protrude outside in the axial direction, and are held rotatably in the bearing holes 13, respectively. One end of the rotation shaft 30a is connected to a door operation mechanism (not shown) at an outside of the inside/outside air switching box 10 to be rotated.

The dimension of the outer wall plate 30b is set at a necessary dimension to close the outside air suction port 12, while the dimensions of the outer wall plate 30b and the side wall plates 30c are set at necessary dimensions to close the inside air suction port 11. As shown in FIG. 3A, in a natural state without an elastic deformation of the inside/outside air switching door 30, both the side wall plates 30c are tilted respectively toward arrows "c" relative to a direction (up-down direction in FIG. 3A) perpendicular to the outer wall plate 30b. In the first embodiment, each tilt angle θ of the side wall plate 30c is approximately 10 degrees. Further, as shown in FIG. 4, the outer wall plate 30b is formed into a wave shape (i.e., uneven shape) extending in the door rotation direction.

Further, as shown in FIG. 2, a rib (protrusion) 30d extending to a door outside is formed in peripheral portions of the side wall plates 30c and the outer wall plate 30b, and packing members 31, 32 are bonded on both face and back surfaces of the rib 30d using an adhesive. Each of the packing members 31, 32 is made of a porous foam such as urethane foam, and is formed into a plate like.

Figure 4:
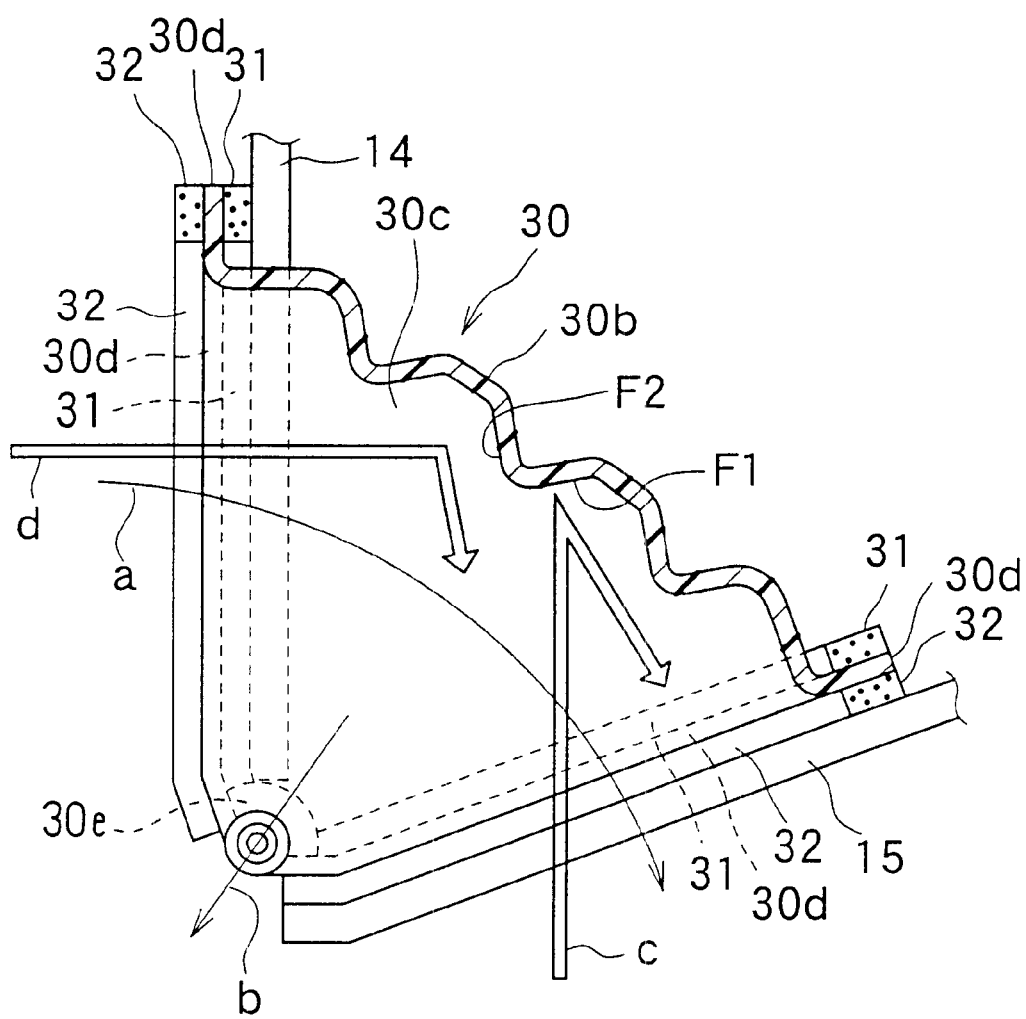
FIG. 4 is a cross-sectional view taken along line IV—IV in FIG. 3A.

On the other hand, as shown in FIG. 4, seal surfaces 14, 15 protruding toward the inside/outside air switching door 30 are integrally provided with the inside/outside air switching box 10 on peripheral portions of the inside air suction port 11 and the outside air suction port 12. The packing members 31, 32 are attached to the inside/outside air switching door 30 so that surfaces of the packing members 31, 32 press-contact the seal surfaces 14, 15 of the inside/outside air switching box 10 in the door rotation direction. Accordingly, the inside air suction port 11 or the outside air suction port 12 can be air-tightly sealed by the inside/outside air switching door 30.

Further, as shown in FIGS. 1–4, seal members 30e each protruding in a fan like on a peripheral surface of the rotation shaft 30a are provided at sides of the side wall plates 30c to be positioned between both parts of the rib 30d. The seal members 30e are provided for sealing the inside/outside air switching box 10 in the axial direction. On the other hand, the other side peripheral surface of each rotation shaft 30a, opposite to the seal member 30e, is formed to be positioned on the same surface as an end surface of the rib 30d, as shown in FIG. 2.

Figure 3B:
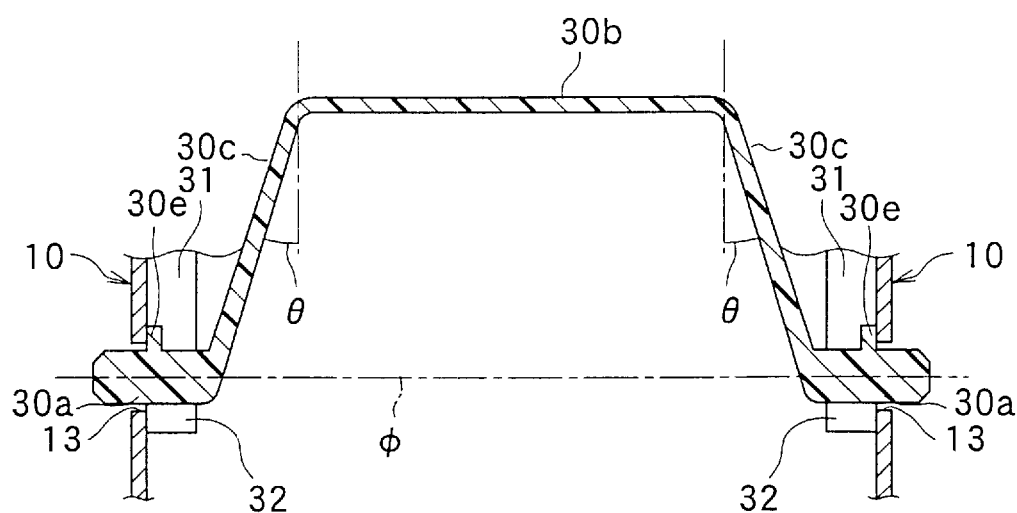

The rotation shafts 30a, the outer wall plate 30b, the side wall plates 30c, the rib 30d and the seal members 30e of the inside/outside air switching door 30 are integrally formed by resin such as polypropylene. In the first embodiment, the inside/outside air switching door 30 is formed to be elastically deformable. FIG. 3A shows a position relationship between the inside/outside air switching door 30 and the inside/outside air switching box 10 in a natural state without an elastic deformation, and FIG. 3B shows a position relationship between the inside/outside air switching door 30 and the inside/outside air switching box 10 in an elastic deformation state.

In an inside air mode, dynamical pressure (ram pressure) of a vehicle traveling, is applied to the outer wall plate 30b of the inside/outside air switching door 30 as shown in FIG. 3A, so that the rotation shafts 30a and the portions of the side wall plates 30c around the rotation shafts 30a are elastically deformed in the arrows "c". That is, the outer wall plate 30b is pressed toward the side wall plates 30c by the ram pressure, and the side wall plates 30c are pressed toward the rotation shafts 30a. Accordingly, the rotation shafts 30a slide in the bearing holes 13 toward outside in the axial direction, and are displaced toward outside of the inside/outside air switching box, respectively. With this displacement of the rotation shafts 30a, the seal members 30e contact peripheral wall surfaces of the bearing holes 13 on the inner surface of the inside/outside air switching box 10.

In the first embodiment, the inside/outside air switching door 30 is set, so that the seal members 30e press-contact the inner surface of the inside/outside air switching box 10 in the axial direction when the ram pressure is equal to or larger than 200 Pa.

Because the inside air suction port 11 is opened and closed not only the outer wall plate 30b but also the side wall plates 30c of the inside/outside air switching door 30, the inside air suction port 11 includes a circumference opening 11a positioned on a vehicle rear side of the inside/outside air switching box 10, and both side openings 11b of the inside/outside air switching box 10 in a vehicle left-right direction. Accordingly, the shape of the inside air suction port 11 is formed into a gate shape opened from a position opposite to the outer wall plate 30b to positions opposite to both the side wall plates 30c. Thus, an opening area for sucking inside air is increased, and maximum cooling capacity in the inside air mode can be improved. On the other hand, the outside air suction port 12 is formed into a rectangular flat opening shape. Further, the inside/outside air switching door 30 is a rotary door constructed to open and close the circumference opening 11a and the side openings 11b.

Further, as shown in FIGS. 3A and 3B, an inner space defined by the outer wall plate 30b and the side wall plates 30c of the inside/outside air switching door 30 is directly opened to an outside in a paper face-back direction of FIGS. 3A and 3B. Therefore, as shown by arrow "a" in FIGS. 1, 4, air freely flows through the inner space of the inside/outside air switching box 10.

Next, operation of the inside/outside air switching device according to the first embodiment will be now described. By rotating the rotary-type inside/outside air switching door 30 around the rotation shafts 30a, the inside air mode or an outside air mode can be switched. FIG. 1 shows a state of the inside air mode.

In the inside air mode, the packing members 31, 32 of the inside/outside air switching door 30 press-contact the seal surfaces 14, 15 around the outside air suction port 12, so that the outside air suction port 12 is fully closed and the inside air suction port 11 is fully opened. Accordingly, by the operation of the blower fan 24, inside air is sucked from the inside air suction port 11, and is blown toward an air conditioning unit of the vehicle air conditioner. 1t Next, when the outside air mode is selected, the inside/outside air switching door 30 is rotated in the counterclockwise direction from the position of FIG. 1 by a predetermined angle. Therefore, the packing members 31, 32 of the inside/outside air switching door 30 press-contact the seal surface around the inside air suction port 11. As a result, the circumference opening 11a and the side openings 11b of the inside air suction port 11 are fully closed by the outer wall plate 30b and the side wall plates 30c, and the outside air suction port 12 is fully opened. In this case, by the operation of the blower fan 24, only outside air is sucked from the outside air suction port 12, and is blown toward the air conditioning unit.

In the inside air mode, the seal surface 14 and the seal surface 15 provided in the inside/outside air switching box 10 are need to be divided around the rotation shaft 30a (see FIG. 5). Further, when the inside/outside air switching door 30 is not elastically deformed as shown in FIG. 3A, a clearance CL (e.g., 0.5 mm) is provided between the seal member 30e formed on the rotation shaft 30a and the inside/outside air switching box 10. Due to the clearance CL, a sliding resistance during the rotation of the inside/outside air switching door 30 can be reduced. However, when the outside air pressure on the inside/outside air switching door 30 at the side of the outside air suction port 12 becomes higher due to the ram pressure, outside air may be leaked from the clearance CL as shown by arrow "b" in FIG. 4.

According to the first embodiment of the present invention, the inside/outside air switching door 30 is elastically deformed by the ram pressure, so that at least the portions of the side wall plates 30c around the rotation shafts 30a are displaced away from each other in the axial direction, and the rotation shafts 30a are also displaced away from each other. By the displacement, each of the seal members 30e press-contacts the inside/outside air switching box 10. Because the seal members 30e press-contact the inside/outside air switching box 10 in the axial direction, a clearance between the inside/outside air switching door 30 and the inside air switching box 10 can be sealed in the axial direction in the inside air mode. Accordingly, in the inside air mode, a leakage of outside air can be sufficiently restricted.

In the first embodiment, because both the side wall plates 30c are tilted to outside in the axial direction, relative to the direction perpendicular to the outer wall plate 30b, a rotation moment in the rotation direction of the inside/outside air switching door 30, generated in the side wall plates 30c can be increased. Therefore, the above-described displacements of both the side wall plates 30c and the rotation shafts 30a can be made easy.

Further, in the first embodiment, the outer wall plate 30b is formed into the wave shape extending in the door rotation direction. Therefore, the rigidity of the outer wall plate 30b in a direction perpendicular to the rotation center axial line φ relative to the ram pressure can be increased as compared with a flat shaped outer wall plate. Accordingly, a bent amount of the outer wall plate 30b in the direction perpendicular to the center axial line φ can be made smaller as compared with that of the flat shaped outer wall plate. Accordingly, the rotation moment generated in the side wall plates 30c in the rotation direction of the inside/outside air switching door 30 can be increased, and the displacements, for displacing at least the portions of the side wall plates 30c around the rotation shafts 30a away from each other, can be made easy.

Further, in the first embodiment of the present invention, because the outer wall plate 30b is formed into the wave shape, air-blowing noise generated in the suction port 21 is reflected to a side (i.e., right side in FIG. 4) opposite to the inside air suction port 11, and a transmission of the air-blowing noise into the passenger compartment can be reduced. More particularly, among the wall surfaces F1, F2 of the inside/outside air switching door 30, because wall surfaces F1 extending approximately horizontally are provided in the outer wall plate 30b to face toward a side opposite to the inside air suction port 11, the air-blowing noise reflecting into the inside air suction port 11 can be greatly reduced.

Further, in the first embodiment, because the noise can be reduced using the wave-shaped outer wall plate 30b without using a rib provided inside the outer wall plate 30b, it can restrict a suction resistance of inside air from the inside air suction port 11. In addition, because the wall surfaces F2 extending approximately in the up-down direction in FIG. 4 is tilted toward a side opposite to the inside air suction port 11. Therefore, a direction of air sucked in the arrow "d" in FIG. 4 can be smoothly changed toward the suction port 21, and the suction resistance of air can be further restricted.

Accordingly, in the first embodiment, the displacements for displacing at least the portions of the side wall plates 30*c* around the rotation shafts 30*a* to be separated from each other can be made easy, and air-blowing noise can be reduced while suction resistant of air can be restricted.

Figure 5A:
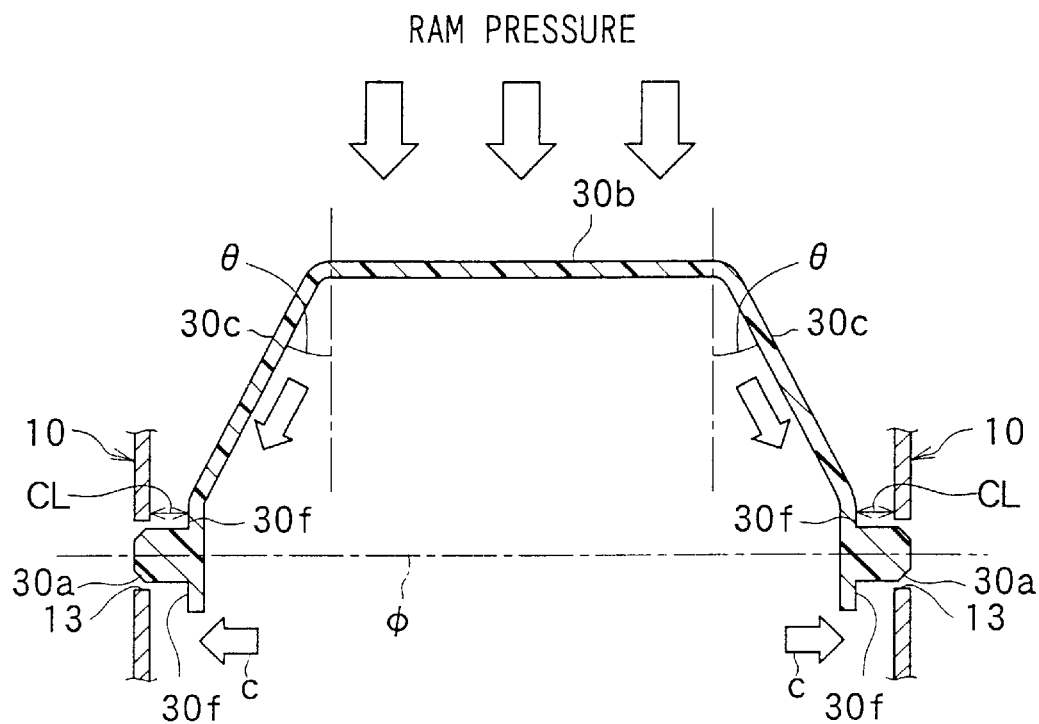
FIG. 5A is a cross-sectional view showing a natural state of an inside/outside air switching door without an elastic deformation.
Figure 5B:
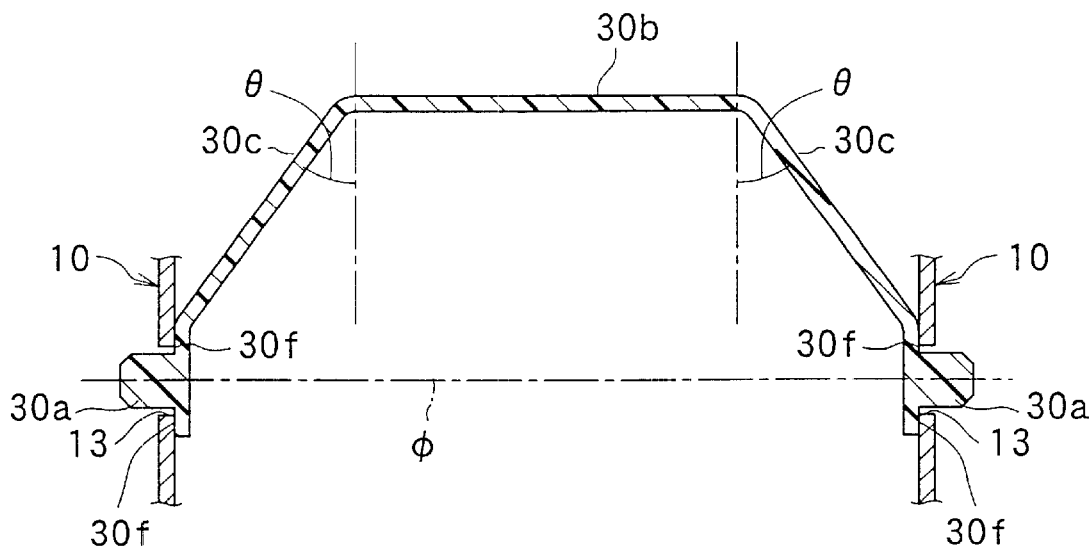
FIG. 5B is a cross-sectional view showing an elastic deformation state of the inside/outside air switching door, according to a second preferred embodiment of the present invention.

A second preferred embodiment of the present invention will be now described with reference to FIGS. 5A and 5B. FIG. 5A shows a natural state of a rotary-type inside/outside air switching door 30 without an elastic deformation, and FIG. 5B shows an elastic deformation state of the inside/outside air switching door 30, according to the second embodiment.

In the above-described first embodiment, the seal members 30*e* are provided on the rotation shafts 30*a*, the side wall plates 30*c* and the rotation shafts 30 are displaced due to the elastic deformation of the inside/outside air switching door 30, and the seal members 30*e* air-tightly contacts the inside/outside air switching box 10 to seal therebetween in the axial direction. However, in the second embodiment, as shown in FIGS. 5A and 5B, the above-described seal members 30*e* may be omitted, and seal surfaces 30*f* parallel to the inner surfaces of the inside/outside air switching box 10 are formed in the side wall plates 30*c* at positions adjacent to the rotation shafts 30*a*. That is, the seal surfaces 30*f* parallel to the inner surfaces of the inside/outside air switching box 10 are provided in the side wall plates 30*c* only at peripheral positions around the rotation shaft 30*a*. Accordingly, when the side wall plates 30*c* and the rotation shafts 30*a* are displaced due to the ram pressure, the seal surfaces 30*f* press-contact the inside/outside air switching box 10 to seal therebetween in the axial direction. Accordingly, the same effect as the above-described first embodiment can be obtained.

Although the present invention has been fully described in connection with the preferred embodiments thereof with reference to the accompanying drawings, it is to be noted that various changes and modifications will become apparent to those skilled in the art.

For example, in the above-described embodiments, the seal members 30*e* of the first embodiment or the seal surfaces 30*f* of the second embodiment are disposed to directly press-contact the inner surfaces of the inside/outside air switching box 10. However, an elastically-deformable elastic material (e.g., porous foam such as urethane foam) may be bonded on the seal members 30*e* or the seal surfaces 30*f*. In this case, sealing performance between the inside/outside air switching door 30 and the inside/outside air switching box 10 in the axial direction can be further improved.

In the above-described first and second embodiments, the outer wall plate 30*b* is formed into the wave shape. However, a flat plate may be used instead of the wave-like outer wall plate 30*b*. In this case, by providing a rib on the inner surface of the flat plate, the rigidity of the flat plate can be increased. Further, the outer wall plate 30*b* may be formed into a circular arc shape around the rotation shaft 30*a*.

In the above-described first and second embodiments, the rotation shafts 30*a* are provided in the inside/outside air switching door 30, and the bearing holes 13 are provided in the inside/outside air switching box 10. However, the rotation shaft 30*a* may be provided in the inside/outside air switching box 10, and the bearing holes 13 may be provided in the inside/outside air switching door 30.

In the above-described first and second embodiments, each of the packing members 31, 32 is formed into a plate like to be boned onto the rib 30*d* of the inside/outside air switching box 10. However, the packing members 31, 32 may be integrally molded with the inside/outside air switching door 30 using an elastomer rubber such as polypropylene type elastomer rubber, while the rotation shafts 30*a*, the outer wall plate 30*b* and the side wall plates 30*c* of the inside/outside air switching door 30 are molded using polypropylene resin.

Such changes and modifications are to be understood as being within the scope of the present invention as defined by the appended claims.

What is claimed is:

1. An inside/outside air switching device for a vehicle, comprising:

an inside/outside air switching box having an inside air suction port from which inside air inside a passenger compartment of the vehicle is introduced, and an outside air suction port from which outside air outside the passenger compartment is introduced;

a rotary door for selectively opening and closing the inside air suction port and the outside air suction port, the rotary door being disposed in the inside/outside air switching box to be rotatable around a rotation center axial line; and a seal member provided at a position around the rotation center axial line, for sealing the inside/outside air switching box in an axial direction, wherein:

the rotary door includes
an outer wall plate extending in a rotation direction of the rotary door, and
both side wall plates extending from both end portions of the outer wall plate in an axial direction toward the rotation center axial line, respectively;

the rotary door is disposed to be elastically deformable in such a manner that at least both parts of the side wall plates around the rotation center axial line are displaced away from each other by a dynamical pressure of a vehicle travelling, applied to the outer wall plate, in an inside air mode where the rotary door closes the outside air suction port and opens the inside air suction port; and the seal member press-contacts an inner surface of the inside/outside air switching box when at least both the parts of the side wall plates around the rotation center axial line are displaced away from each other by a predetermined distance.

2. The inside/outside air switching device according to claim 1, wherein the seal member is provided on the side wall plates around the rotation center axial line.

3. The inside/outside air switching device according to claim 1, wherein the seal member is disposed at both positions outside the rotary door to be separated from the parts of the side wall plates around the rotation center axial line, respectively, in the axial direction.

4. The inside/outside air switching device according to claim 1, wherein, in a natural state of the rotary door, both the side wall plates are tilted, respectively, toward the sides of the displacements, relative to a direction perpendicular to the outer wall plate.

5. The inside/outside air switching device according to claim 4, wherein each of the side wall plates is tilted by a tilt angle equal to or larger than 10 degrees.

6. The inside/outside air switching device according to claim 1, wherein the outer wall plate is formed into a shape to have a rigidity in a direction perpendicular to the rotation center axial line, larger than a predetermined value.

7. The inside/outside air switching device according to claim 1, wherein the outer wall plate has a wave shape extending in the rotation direction of the rotary door.

8. The inside/outside air switching device according to claim 1, wherein:
- the seal member has a contact surface opposite to the inner surface of the inside/outside air switching box; and
- and the contact surface is parallel to the inner surface of the inside/outside air switching box.

9. The inside/outside air switching device according to claim 8, further comprising
- an elastic member on the contact surface of the seal member.

10. The inside/outside air switching device according to claim 1, wherein:
- the rotary door has both rotation shafts connected to both the side wall plates, respectively, around the rotation center axial line; and
- the rotation shafts are displaced away from each other by the dynamical pressure of the vehicle travelling, applied to the outer wall plate, in the inside air mode.

11. The inside/outside air switching device according to claim 10, wherein:
- the inside/outside air switching box has both bearing holes in which the rotation shafts are held, respectively, to be rotatable; and
- the seal member press-contacts the inner surface of the inside/outside air switching box around the bearing holes.

12. The inside/outside air switching device according to claim 11, wherein the seal member is disposed on the rotation shafts at outside of each side wall plate, to be parallel to the inner surface.

13. The inside/outside air switching device according to claim 11, wherein the seal member is disposed in each side wall plate around the rotational center axial line to be parallel to the inner surface.

* * * * *